United States Patent Office 3,008,735
Patented Nov. 14, 1961

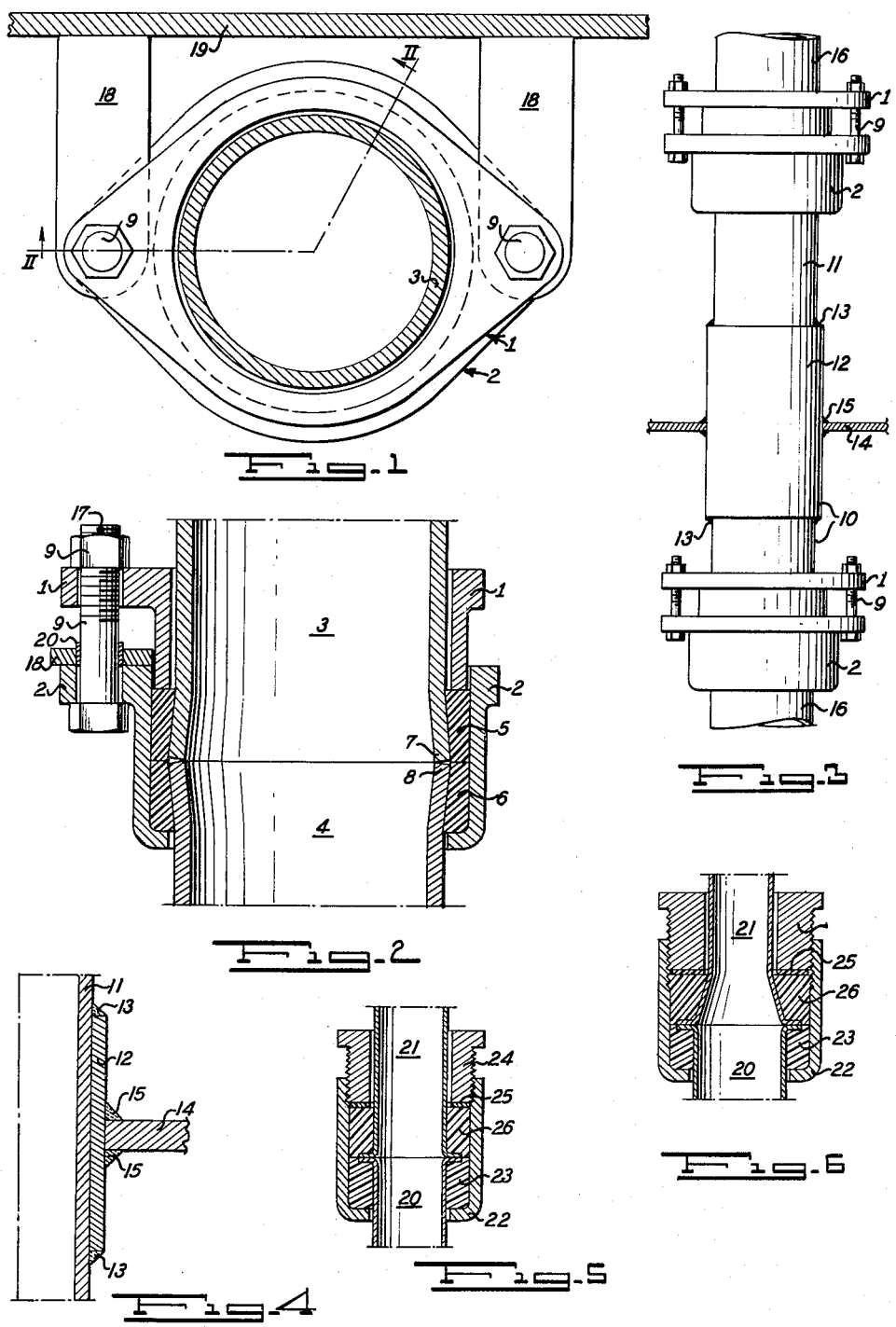

3,008,735
PIPE COUPLING AND METHOD FOR INTERCONNECTING PIPES
Johannes E. van Wijngaarden, Bos en Lommerweg 335, Amsterdam, Netherlands
Filed Aug. 28, 1958, Ser. No. 757,878
Claims priority, application Netherlands Sept. 5, 1957
1 Claim. (Cl. 285—61)

The invention relates to pipe couplings for interconnecting pipes such as air pipes, scupper pipes, draining pipes, sanitary pipes or the like, particularly on ships, and further relates to methods for interconnecting pipes.

At present, pipes on ships are interconnected in general by means of flange connections. The pipes have to be manufactured from so-called "black" or non-galvanized pipe material, as the connecting flanges have to be welded subsequently thereon. The use of galvanized pipes would be impossible, as during the welding operation the zinc layer would be burnt off. According to one known procedure, a pipe conduit, which is planned for a ship and which in general is to be positioned between two deck-passage-pieces, is sketched in position first, whereafter the pipe is manufactured in a copper smithy and transported to the ship to be adjusted and to be provided with the flanges which are welded thereon. The pipe is disconnected again and transported to the galvanizing department, and after the pipe has been galvanized, the final mounting takes place. This known method has the disadvantage that the repeated transporting of the pipe to and from the ship takes up much time and is therefore costly.

Furthermore, the installing of pipes will cause difficulties in many cases as the so-called deck-pieces have to be fitted in decks to which pipes have to be connected on both sides. These deck-pieces can be provided in advance with a flange at one side only in order to allow the passage of these deck-pieces, while the other flange has to be applied in situ. This may be done by means of beading when relatively thin tubes are used, but if thicker tubes are used, the flange will have to be welded thereto. This can only be done at the upper side of the flange, as there is no room available for welding at the under side of the flange. This welding damages the galvanized pipe, while the welding of the welding sleeve to the underside of the deck will be difficult in many cases due to lack of space.

It is an object of the invention to provide a pipe coupling for interconnecting pipes, particularly on ships, which coupling may be locked with respect to the pipes without the necessity of welding operations.

It is a further object of the invention to provide a pipe coupling for interconnecting galvanized pipes, particularly on ships.

It is another object of the invention to provide a method for coupling pipes on ships in an improved and accelerated manner.

It is still a further object of the invention to provide a pipe coupling for interconnecting pipes, particularly on ships, with which a considerable saving of space may be obtained.

It is still another object of the invention to provide a pipe coupling which is somewhat flexible in order to simplify the mounting of the pipes.

It is a further object of the invention to provide a pipe coupling which will facilitate the dismounting of the pipes.

It is another object of the invention to provide a pipe coupling, wherein the connection between the pipes will be maintained when the packing material is burnt as in the case of fire.

According to the present invention, a pipe coupling is characterized by a bowl-shaped packing bushing, which has a passage in its bottom wall through which one of the pipes to be connected extends, the end of said pipe being flared. There is further provided a packing gland having an axial bore through which a second pipe extends of which the end is also flared. The packing bushing and the packing gland in their working positions are interconnected in their longitudinal direction under pressure in such manner that a packing in the packing space formed by the side wall of the packing bushing and both pipe ends is compressed to form a seal between the pipes. According to the present invention, the welding of the flanges becomes unnecessary, as a locking of the coupling elements with respect to the pipes is obtained by means of the pipe ends. Therefore, welding operations are superfluous, so that it is possible to use galvanized piping material, whereby the pipes may be cut to measure and bent in situ, so that the cumbersome transportation of pipes to and from the ship may be dispensed with.

A preferred method for coupling two pipes on ships by means of a pipe coupling according to the invention is characterized in that a bowl-shaped packing bushing having an opening in its bottom wall is slid over one of the pipes to be connected, whereafter the end of this pipe is flared, while a packing gland is slid over the other pipe, whereafter the end of this second pipe is also flared, whereupon the packing bushing and the packing gland are connected to each other in such a manner that the packing in the packing space enclosed by the side wall of the packing bushing and both pipe ends is compressed to form a seal between the pipes.

To install a pipe connection on board ship in accordance with the invention, the deck-passage-pieces are first mounted, each consisting of a normal welding sleeve in which a pipe is welded. Before the mounting of a deck-passage-piece in an opening of a deck, one of the coupling elements is slid over an end of the pipe, whereafter this end is flared by means of a mandrel. In this manner, the welding of the welding sleeve to the deck may be effected in a very simple manner as the coupling element which has been mounted thereon is rotatable, so that this element may be placed in its most favorable position. This is an important improvement with respect to the fixed flange construction of the known deck-passage-pieces which interfere with the welding operation.

After a deck-passage-piece has been mounted, a second coupling element is slid over the upper end of the pipe of the deck-piece, whereafter this end is also somewhat flared. After the dimensions and the shape of a pipe to be positioned between two deck-passage-pieces has been fixed by means of a jig, the pipe is manufactured directly from galvanized iron on board, whereafter the respective coupling elements are slid on both ends thereof and the pipe ends are flared. Then the co-operating coupling elements are moved towards each other under pressure, which is achieved in a preferred embodiment of the invention by means of bolts which interconnect the packing bushing and the packing gland in an adjustable manner. During the movement of the co-operating coupling elements towards each other, the packing is compressed so as to form a seal between the pipes.

According to a preferred embodiment of the invention, a pressure ring of rubber or similar material is slid over each of the ends of both pipes before these ends are flared. As previously galvanized piping material may be used, the transportation to and from the ship and the intermediate galvanizing step may be dispensed with, so that a considerable gain of time may be obtained.

Furthermore, as the pipe is cut and bent on board, the sketching of the pipes, which takes up much time, becomes superfluous as well, as the preparation of a simple jig suffices, which jig may be used on the spot, so that no danger of deformation thereof exists.

The invention will be further described with reference to the accompanying drawings which show various embodiments of the invention. In the drawings:

FIG. 1 is a top view of a first embodiment of the invention.

FIG. 2 is a longitudinal sectional view along line II—II in FIG. 1.

FIG. 3 is a view of a pipe conduit which extends through a deck and which is provided with pipe couplings according to the invention.

FIG. 4 is a partial sectional view of a deck-passage-piece on enlarged scale.

FIGS. 5 and 6 are respectively longitudinal sectional views of modified embodiments of the invention.

The pipe coupling according to the invention and as shown in FIGS. 1 and 2, mainly consists of a packing gland 1 and a bowl-shaped packing bushing 2, having a passage in the bottom wall thereof. Each of these coupling elements is slid over the end of one of the pipes 3 and 4 to be coupled, together with pressure rings 5 and 6 of rubber or similar material. The ends 7, 8 of the pipes 3, 4 are somewhat flared or expanded and given a conical shape by means of a mandrel, whereafter the packing gland 1 and the packing bushing 2 are moved towards each other by means of bolts and nuts 9. The two pressure rings 5, 6 are compressed in the double conical packing space, enclosed by the ends of the pipes 7, 8 and the upstanding side wall of the packing bushing 2, so that the pipes are efficiently sealed.

This pipe coupling may be used with advantage for connecting pipes on board ships as shown in FIG. 3. The deck- or bulkhead passage-pieces 10 are prefabricated in a copper smithy from a pipe 11 and a welding sleeve 12 which are welded together at 13 and are galvanized thereafter. A packing gland 1 and a rubber pressure ring 5 are slid over the under end of pipe 11, whereafter this end is expanded by means of a mandrel or the like. Then, the various passage openings in the decks 14 are marked and cut by means of burners, whereupon a passage-piece is slid through each opening from the under side and connected to the deck 14 by welding at 15. This welding operation may be performed in a very simple manner as no interfering flanges or the like are present near the welding spot. Then, a packing bushing 2 and a rubber pressure ring 6 are slid over the upper end of the pipe 11 of the passage-piece 10, whereafter this upper end is expanded. The exact length and shape of the pipe to be positioned between two passage-pieces 10 in succeeding decks or bulkheads 14 may be measured by means of a jig, whereafter this pipe may be cut to measure from galvanized pipe and bent in situ. This pipe 16 is provided at one end with a packing bushing 2 and a rubber pressure ring 6 and at the other end with a packing gland 1 and a rubber pressure ring 5, whereafter the ends of the pipe 16 are expanded. Then, the pipe 16 is positioned between two mounted deck- or bulkhead pieces 10, whereafter the co-operating packing bushings 2 and packing glands 1 are moved towards each other by means of bolts and nuts 9, so that the pressure rings 5, 6 are compressed so as to seal the pipes. The nuts 9 may be fixed in known manner by means of a split pin 17.

In accordance with the present invention, the pipes may be suspended in a very simple manner by means of suspension bows 18, which are each provided with an opening for being mounted on a bolt 9 and which are further connected to a deck- or wall-part 19. In this manner, no special suspension bows are needed. Preferably, a rubber ring 20 is applied between the bolt 9 and the suspension bow 18 in order to prevent vibrations from being transferred to the pipe. The pipe ends are expanded to such an extent that the packing bushing 2 and the packing gland 1 are prevented from passing over the associated ends 8, 7. In this manner the important advantage is obtained that the connection between the pipes will be maintained, when the packing material, i.e. the rubber pressure rings 5, 6, is burnt in case of fire.

As only two connecting bolts 9 have to be applied in order to obtain a sufficient seal between the pipes, the packing gland 1 and the packing bushing 2 may have an oval shape, so that the pipes may be positioned closer to the wall and the coupling takes less space in a transverse direction than known circular flange couplings. For this reason, a considerable saving of space may be obtained between the ceilings as well as between walls on board ships. The saving of space at the ceiling may allow for shorter distances between decks which results in a reduction in the costs of materials and in an improved stability of the ship.

The mounting of the pipes is simplified by the fact that the couplings are somewhat flexible, while the application of flexible rubber pressure rings prevents the transfer of vibrations from one coupled pipe to another.

Furthermore, the dismounting of the piping during repair activities may be effected in a much simpler manner, as only the bolts 9 have to be sawed through, whereas the use of the known flange couplings necessitates the breaking or burning of a great number of nuts as, for instance, in tanks, which is a laborious procedure.

The pipe coupling according to the invention may be used as well for connecting sanitary conduits and the like in houses and the like. In FIGS. 5 and 6, two preferred embodiments of a pipe coupling for use for this purpose are shown by way of example.

FIG. 5 shows the connection of two pipes 20 and 21, which may be made of copper. A packing bushing 22 and packing means 23 consisting of rubber, plastic or like material are slid onto the pipe 20, whereafter the edge is bent at right angles, which is rather easy with copper pipes. A packing gland 24, a washer 25 and packing material 26 corresponding with the packing material 23 is slid onto the other pipe, whereafter the edge thereof is bent at right angles too. The packing bushing 22 is provided with an internal thread, while the packing gland 24 is provided with an external thread, so that the packing gland 24 may be screwed into the packing bushing 22, during which screwing movement the washer 25 protects the packing material. As the edges of the pipes 20, 21 are bent at right angles these edges rest on each other in the coupled position, which improves the seal between the pipes. The packing gland 24 and the packing bushing 22 may be hexagonal in cross-section in order to facilitate the screwing on of these elements.

FIG. 6 shows a similar pipe coupling, wherein the pipe 20 has another diameter than the pipe 21.

It will be understood that although the pipe coupling has been shown in the drawings with a packing bushing at the under side and a packing gland at the upper side, this arrangement may be modified at choice, provided that two co-operating coupling elements always face each other.

The invention is not limited to the embodiments shown in the drawings which may be modified in different manners within the scope of the invention.

What I claim is:

A pipe coupling comprising an annular bowl-shaped packing bushing having a side wall and a bottom wall connected to the side wall and provided with a passage, a first pipe extending through said passage and including a frusto-conical outwardly extending end lying within said side wall, a second pipe substantially in axial alignment with said first pipe and including a frusto-conical outwardly extending end facing said frusto-conical end of said first pipe and lying within said side wall, said side wall, bottom wall and pipes defining an annular space therebetween, a packing gland having an axial bore surrounding said second pipe and including a flange extending between said packing bushing and said second pipe, two annular pressure rings of elastic material in end-to-end abutting relation, the rings surrounding the frusto-conical ends of said pipes and being sandwiched between said side wall and said first and second pipes and substantially filling the said annular space, a side flange on said packing bushing having a plurality of holes, a side flange on said packing gland having a plurality of corresponding holes, a plurality of bolts extending through said holes in said flanges and forcibly interconnecting said packing gland and said packing bushing so as to compress said pressure rings and to urge the ends of said first and second pipes into end-to-end abutting and sealed relationship, and a plurality of elongated suspension bows, said bows each being provided with a hole at one end and being mounted by means of said hole on respective of said bolts between the said side flanges, and supporting means, said suspension bows being connected at the other ends thereof to said supporting means whereby said supporting means supports said pipes.

References Cited in the file of this patent

UNITED STATES PATENTS

| | | |
|---|---|---|
| 333,410 | Hawkins | Dec. 29, 1885 |
| 350,421 | Dresser | Oct. 5, 1886 |
| 381,869 | Williams | Apr. 24, 1888 |
| 919,970 | Smith | Apr. 27, 1909 |
| 1,281,498 | Brevig | Oct. 15, 1918 |
| 1,959,630 | Keitel | May 22, 1934 |
| 2,158,447 | Whitsett | May 16, 1939 |
| 2,341,629 | Kriedel | Feb. 15, 1944 |
| 2,343,896 | Fishko | Mar. 14, 1944 |
| 2,368,391 | Young | Jan. 30, 1945 |
| 2,523,578 | Lewis | Sept. 26, 1950 |
| 2,757,023 | Hein | July 31, 1956 |

FOREIGN PATENTS

| | | |
|---|---|---|
| 498,686 | Great Britain | Jan. 12, 1939 |
| 515,002 | Great Britain | Nov. 23, 1939 |